United States Patent
Salvo et al.

(10) Patent No.: US 11,187,567 B2
(45) Date of Patent: Nov. 30, 2021

(54) MODULAR SEALING APPARATUS WITH FAILURE DETECTION UNIT

(71) Applicant: Endress+Hauser Wetzer GmbH+Co. KG, Nesselwang (DE)

(72) Inventors: Erika Salvo, Milan (IT); Michele Pietroni, S.Donato (IT); Luca Palma, Milan (IT); Andrea Liani, Camino al Tagliamento (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 0 days.

(21) Appl. No.: 16/645,144

(22) PCT Filed: Aug. 16, 2018

(86) PCT No.: PCT/EP2018/072221
§ 371 (c)(1),
(2) Date: Mar. 6, 2020

(87) PCT Pub. No.: WO2019/048209
PCT Pub. Date: Mar. 14, 2019

(65) Prior Publication Data
US 2020/0309585 A1    Oct. 1, 2020

(30) Foreign Application Priority Data
Sep. 7, 2017    (EP) .................................... 17189961

(51) Int. Cl.
*G01F 15/14*    (2006.01)
*G01D 11/24*    (2006.01)
(Continued)

(52) U.S. Cl.
CPC ........... *G01F 15/14* (2013.01); *G01D 11/245* (2013.01); *G01F 15/185* (2013.01); *G01N 9/36* (2013.01)

(58) Field of Classification Search
CPC ...... G01F 15/14; G01F 15/185; G01D 11/245; G01N 9/36
See application file for complete search history.

(56) References Cited

U.S. PATENT DOCUMENTS 3,845,661 A     11/1974  Hollweck et al.
4,064,756 A  *  12/1977  MacLean ............... G01K 1/143
                                                  374/138

(Continued)

FOREIGN PATENT DOCUMENTS

CN    101087059 A    12/2007
CN    101600943 A    12/2009
(Continued)

*Primary Examiner* — Jamel E Williams
(74) *Attorney, Agent, or Firm* — Christopher R. Powers; Endress+Hauser (USA) Holding Inc.

(57) ABSTRACT

The present disclosure relates to a modular installation assembly, at least comprising: a rod-shaped measuring insert for sensing a process variable of a medium, an assembly housing for accommodating at least a part of said measuring insert, which housing at least comprises a first housing part and a second housing part, a first chamber provided in said first housing part, and a second chamber provided in said second housing part. Further, the assembly housing comprises a sealing element which sealing element has at least one opening through which the measuring insert proceeds, and connecting means for connecting said first housing part with said second housing part via the sealing element.

13 Claims, 2 Drawing Sheets

(51) Int. Cl.
*G01F 15/18* (2006.01)
*G01N 9/36* (2006.01)

(56) References Cited

U.S. PATENT DOCUMENTS

| | | | | |
|---|---|---|---|---|
| 4,376,227 A | * | 3/1983 | Hilborn | G01K 1/14 |
| | | | | 136/230 |
| 4,385,197 A | | 5/1983 | Schwagerman | |
| 4,410,756 A | | 10/1983 | Schwagerman | |
| 4,653,935 A | | 3/1987 | Daily et al. | |
| 5,029,471 A | | 7/1991 | Goodrich | |
| 5,152,608 A | * | 10/1992 | Dutcher | G01K 1/08 |
| | | | | 136/230 |
| 5,613,549 A | | 3/1997 | Dolwani | |
| 5,775,807 A | * | 7/1998 | Dutcher | G01K 1/14 |
| | | | | 136/230 |
| 5,907,112 A | | 5/1999 | Queyquep | |
| 6,182,520 B1 | | 2/2001 | Church et al. | |
| 6,543,303 B1 | * | 4/2003 | Hilborn | G01D 11/24 |
| | | | | 73/866.5 |
| 6,599,011 B2 | * | 7/2003 | Daily | G01K 1/026 |
| | | | | 136/201 |
| 7,695,190 B2 | * | 4/2010 | Davda | G01K 1/12 |
| | | | | 374/179 |
| 10,107,700 B2 | * | 10/2018 | Hedtke | G01F 1/42 |
| 2003/0127114 A1 | * | 7/2003 | Lin | B08B 3/04 |
| | | | | 134/25.4 |
| 2005/0223781 A1 | | 10/2005 | Renk et al. | |
| 2012/0261004 A1 | * | 10/2012 | Pietroni | G01D 11/245 |
| | | | | 137/343 |
| 2015/0059469 A1 | * | 3/2015 | Batti | G01F 23/22 |
| | | | | 73/295 |
| 2019/0003894 A1 | * | 1/2019 | Umkehrer | G01K 1/026 |
| 2019/0228637 A1 | * | 7/2019 | Chen | G01L 19/12 |
| 2020/0378838 A1 | * | 12/2020 | Litteaur | G01K 7/026 |

FOREIGN PATENT DOCUMENTS

| | | |
|---|---|---|
| CN | 101919009 A | 12/2010 |
| CN | 102368041 A | 3/2012 |
| CN | 102778243 A | 11/2012 |
| CN | 203132614 U | 8/2013 |
| DE | 2235676 A1 | 2/1974 |
| DE | 3644100 A1 | 7/1988 |
| DE | 4118715 A1 | 12/1992 |
| DE | 102008024730 A1 | 11/2009 |
| EP | 3118583 A1 | 1/2017 |
| WO | 2011076481 A1 | 6/2011 |

* cited by examiner

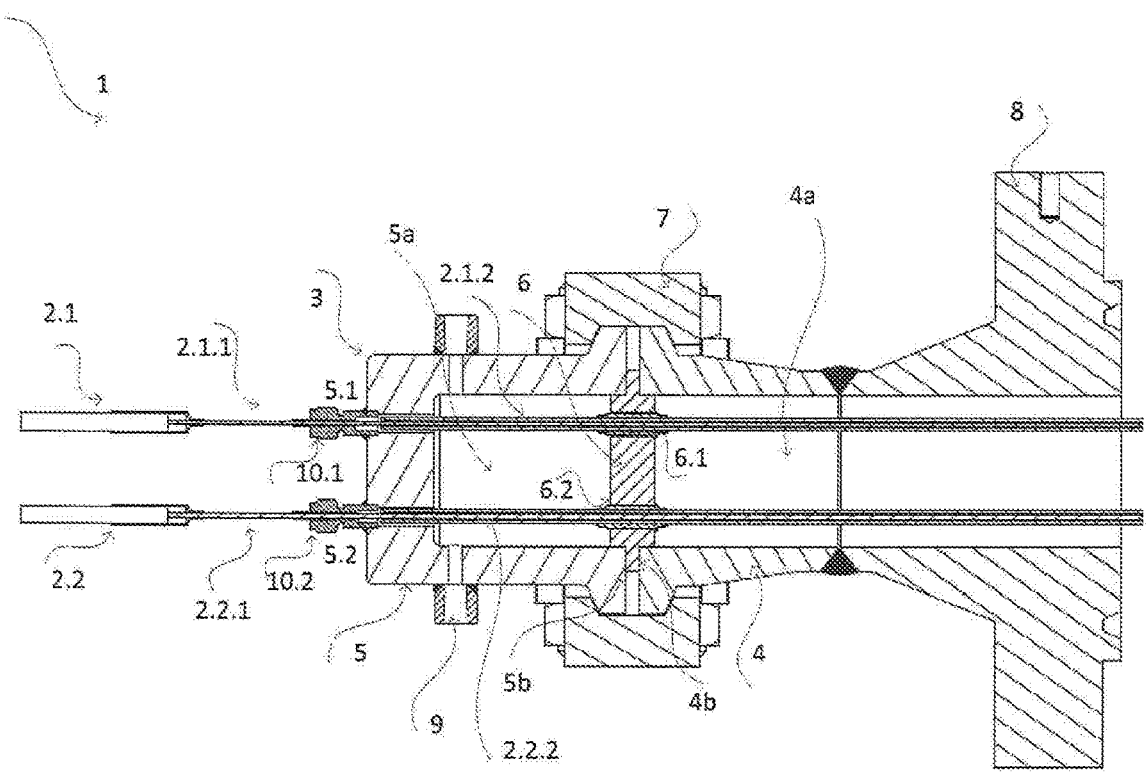
Fig. 1
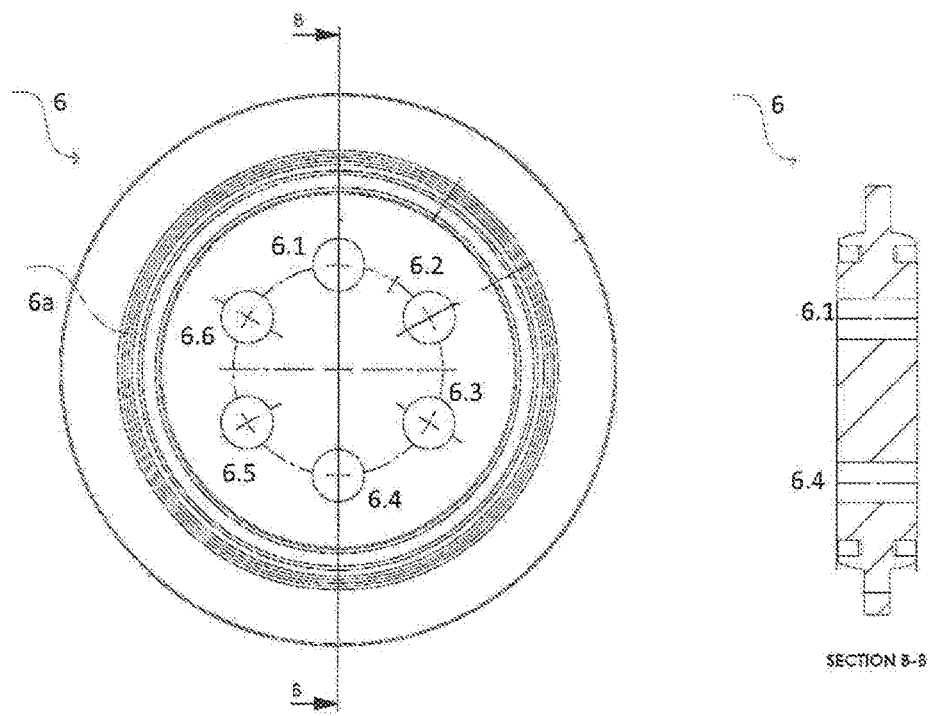
Fig. 2a  Fig. 2b
Fig. 2

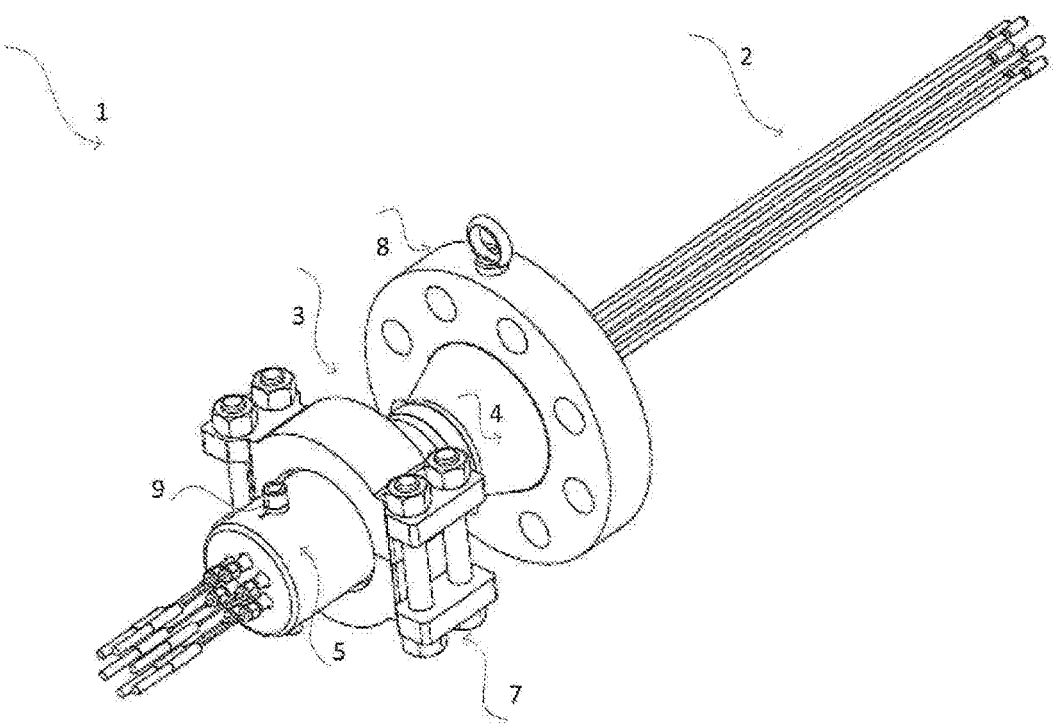
Fig. 3a
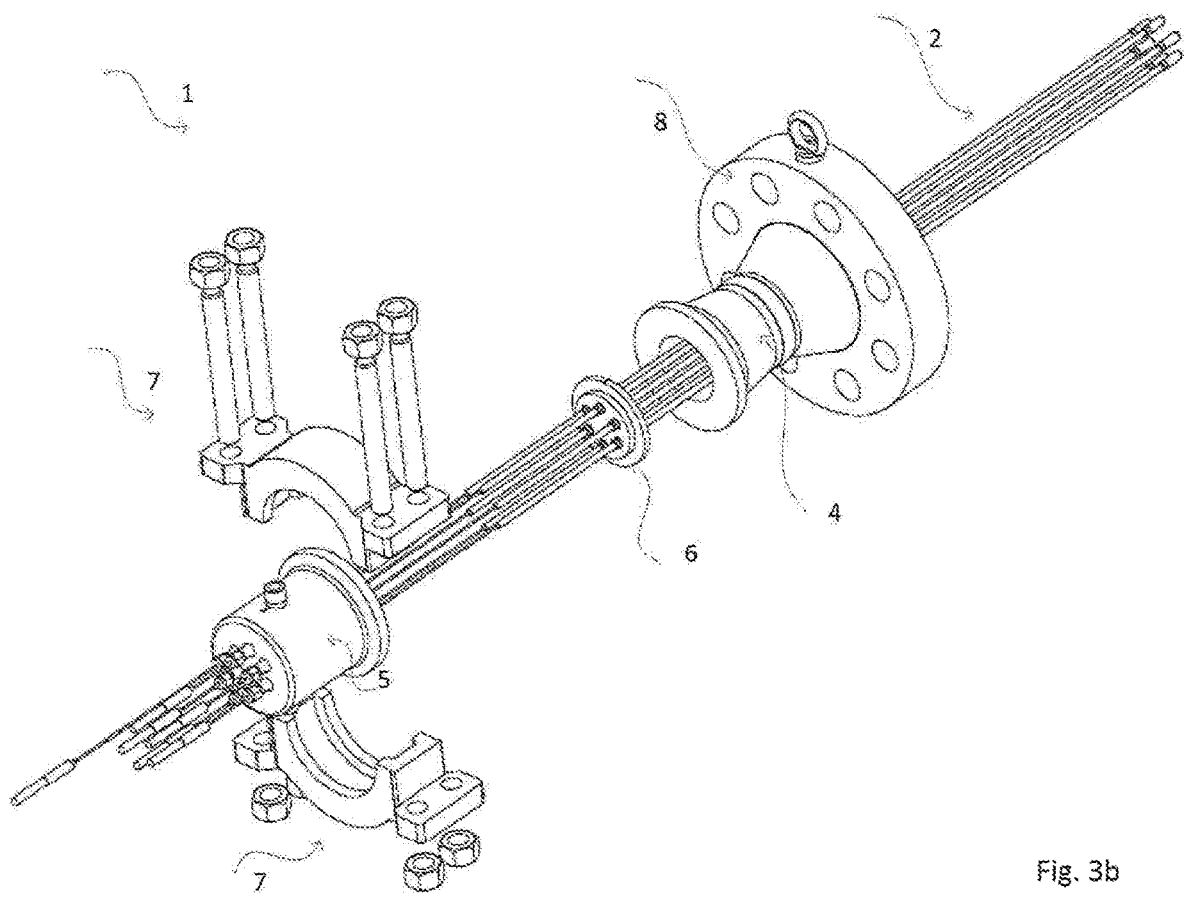
Fig. 3b
Fig. 3

MODULAR SEALING APPARATUS WITH FAILURE DETECTION UNIT

CROSS-REFERENCE TO RELATED APPLICATIONS

The present application is related to and claims the priority benefit of European Patent Application No. 17189961.0, filed on Sep. 7, 2017 and International Patent Application No. PCT/EP2018/072221, filed on Aug. 16, 2018, the entire contents of which are incorporated herein by reference.

TECHNICAL FIELD

The present invention is concerned with a modular installation assembly at least comprising a rod-shaped measuring insert and an assembly housing for accommodating the measuring insert. The measuring insert is preferably part of a field device.

BACKGROUND

Commonly known field devices are e.g. fill level measuring devices, flow meters, pressure gages, thermometers, pH meters, conductivity meters which serve for determining and/or monitoring the process variables fill level, flow, pressure, temperature, pH-value, or conductivity of a medium, which is typically a liquid or a gas. The measuring principles of such field devices are commonly known in the state of the art as well.

In process and/or automation technology many measuring inserts need to be removed from the process from time to time, e.g. due to a need for cleaning or maintenance. In case of a defect, also a complete replacement of the measuring insert or also of the entire field device may become necessary. In particular, measuring inserts which at least partially and/or temporarily come into contact with the medium are often mounted with an installation assembly, like e. g. an immersion tube. Such measuring inserts are guided into the container in which the medium is stored via an opening in a container wall. The installation assembly then serves for closing the opening if the measuring insert is withdrawn from the process. In this manner, the process does not need to be interrupted. Rather, it is desirable to keep the process running for a certain period of time even in case of a defect of the installation assembly.

U.S. Pat. No. 4,376,227 suggests a protective tube-like assembly, which is rigidly inserted in a container. By means of a flange connection, it adjoins on an outwardly closed off protective tube body. A single flange seal thereby serves as sealing element which immediately opens the container interior once disassembled.

U.S. Pat. No. 4,385,197 describes an arrangement of thermocouples, wherein a wall affixing within a protective tube system should assure good thermal contact to the measured medium and, for replacement purposes, offers a releasable, service-friendly securement.

Furthermore, U.S. Pat. No. 4,410,756 presents an apparatus, which should offer good thermal contact with the medium and an easy exchangeability, wherein thermal contact with the protective tube is only provided mechanically for the measurement-ready probe, without additional safety precautions.

Similarly, U.S. Pat. No. 4,653,935 describes a one-chamber, high pressure embodiment, without additional safety precautions.

Disclosure document DE2235676 discloses an outwardly unprotected sealing element, wherein the thermometer end is sealed directly on a container to be sealed using a screwable squeeze seal to the container, e.g. in order to enable replacement for service purposes.

From disclosure document DE4118715 an apparatus for electrically insulated securement of a metal probe electrode in the opening of a housing has become known. A rod electrode is introduced in an installation assembly, wherein the installation assembly has a process connection, to which a so-called housing head is directly connected, in which an associated operating electronics is located.

U.S. Pat. No. 5,907,112 describes a measuring probe, which has a double sealing stage. This sealing stage is formed by a tubular piece, which can be screwed on an end of the measuring probe facing away from the process. The measuring probe is then electrically contacted via the tubular piece. However, the measuring probe or its measuring insert cannot be inserted or removed via the tubular piece.

The publication US2005/0223781A1 shows a measuring arrangement with a safety module, which likewise has two sealing stages. In such case, the safety module is likewise composed of a housing part, through which the measuring robe can be electrically contacted. The actual measuring probe of the measuring insert is, in such case, exposed on the process side to the measured material, and connected with the safety module via a permanent seal, via which the measuring insert cannot be replaced, without measured material escaping from the process.

The publication WO2011076481A1 in turn presents an installation assembly, that can be operated safely even in case of a leakage of the installation assembly and penetration of the measured material into the installation assembly. The installation assembly comprises an assembly housing for accommodating at least one rod-shaped measuring insert, wherein the assembly housing has tubular first and second parts. For accommodating the measuring insert, a first safety chamber is provided in the first housing part and a second safety chamber in the second housing part. The first housing part further has a process connection facing away from the first housing part. Further, a seal-off apparatus is provided, which, in the case of a measuring insert introduced into the assembly housing, serves to seal off the second safety chamber from the first safety chamber, especially in a pressure-tight and/or liquid-tight manner. By means of the proposed installation assembly, correct performance of the device can be monitored during operation and further, due to the double sealing barrier provided, the process does even not need to be interrupted immediately in case of a defect. Rather, necessary maintenance actions can be planned in advance. However, in case a sealing event was initiated it often becomes necessary to replace the entire installation assembly.

SUMMARY

Hence, it is an object of the present invention to provide an installation assembly, that can be operated safely even in case of a leakage and that allows for an easy and straightforward exchange.

The object is achieved by means of a modular installation assembly, at least comprising a rod-shaped measuring insert for sensing a process variable of a medium and an assembly housing for accommodating at least a part of said measuring insert, which housing at least comprises a first housing part and a second housing part. A first chamber provided in said first housing part, and a second chamber is provided in said second housing part. The assembly housing further comprises a sealing element which sealing element has at least one opening through which the measuring insert proceeds and connecting means for connecting said first housing part with said second housing part via said sealing element.

By means of the solution according to the present invention, the installation assembly can be easily replaced or removed in case of a failure, e.g. a leakage or a defect. The connection means allow for assembling or disassembling of the modular installation assembly at the process in a fast and straightforward manner. Preferably, the connecting means allow for a detachable connection between the two housing parts. This in turn ensures a much shorter interruption of the process. Due to the modularity, not only the entire installation assembly is replaceable. Rather, also single components, as e.g. the at least one measuring insert itself or the sealing element can separately be removed or exchanged. Advantageously, those components of the installation assembly without any failure can be retained thereby saving costs. In case of an assembly with more than one measuring insert the present invention further makes it possible to only exchange single measuring inserts in case of a failure in one certain insert. For a multipoint sensing assembly comprising a multitude of measuring inserts the sealing element preferably exhibits a multitude of openings as well.

The modular installation assembly according to the present invention is further embodied to seal off the second safety chamber from the first safety chamber, especially in a pressure-tight and/or liquid-tight manner. Preferably, the installation assembly is embodied to seal off the first housing part from the second housing part in case of a leakage at the first housing part. Such leakage often occurs in case of applications in hazardous environments, e.g. with highly aggressive media.

By means of the present invention, common safety, e.g. with respect to functional safety like defined by the SIL or ATEX standards, can be met without pausing the process once the failure occurs. The interruption safety of a measuring device, for which the installation assembly is used, can thus highly be increased. E. g. in case of a leakage of the first housing past, measurement operation can be continued for a certain period of time making it possible to plan necessary maintenance operation in advance.

The housing or the two housing parts respectively, can have several different embodiments which are all covered by the present invention. However, it is preferred, if at least one of the housing parts is embodied to be tubular or concentrically conical. Each housing part may be built up by one piece, i.e. machined from one single piece, or built up by several components joint together. At least two portions of the two housing parts, facing each other when assembled via the connecting means preferably are at least partially embodied so that they are complementary to each other. Further, at least one of the two housing parts, preferably both housing parts, may have at least one opening, preferably a bore, preferably proceeding along the same axis as the opening of the sealing element, for receiving the at least one measuring insert. Accordingly, the measuring insert proceeds through at least one of the housing parts and the sealing element.

At least one of the two housing parts preferably is composed by a metal, e.g. stainless steel, nickel, chromium, cobalt, molybdenum, an alloy of at least two metals, or by an at least partially coated metal. The coating proceeds at least along an inner wall of the housing part and preferably consists of a material able to withstand high pressures and/or high temperatures.

In one embodiment, the first housing part has a process connection, which process connection is arranged on a side of the housing part opposite to a side on which said first housing part is connected with the second housing part. Preferably, the process connection is welded to the first housing part. Via the process connection, the installation assembly is mountable to a container in which the medium is stored.

In a preferred embodiment, at least one housing part is equipped with at least one sensing element for monitoring the chamber of said housing part. The sensing element may either be permanently associated with the housing part, e.g. permanently mounted with said housing part, e.g. on a wall. Alternatively, the housing part may comprise a connection for the at least one sensing element. Also, in such connection various sensing assemblies may be temporally mounted, depending on the kind of information of the chamber which is needed. The connection may comprise an opening in one wall of said housing part. In case, no sensing element is mounted, the opening may be closed by means of a plug sealing said chamber from the environment especially in a gas-tight and/or liquid tight manner.

In this concern, it is of advantage if the at least one sensing element serves for sensing a density, a pressure or a chemical composition of a medium contained in said chamber. Detecting an, especially instantaneous change of one of these quantities may be indicative for a leakage of the installation assembly, e.g. a leakage of the sealing element or the at least one measuring insert.

Accordingly, at least one of the two chambers features a diagnosis function which further increases the safety of the installation assembly. By monitoring the density, pressure or chemical composition of a medium contained in the chamber of at least one of the two housings, a failure of the installation assembly can be detected. Depending on the specific embodiment of the arrangement, number and type of sensing elements installed, it may become possible to also identify which component has a failure or where a leakage occurred.

In another preferred embodiment the sealing element serves to seal said second chamber from said first chamber, and/or said first and second chamber from an external environment of said installation assembly, in particular in a gas-tight and/or liquid-tight manner. In particular, the sealing element is embodied to assure a structural strength of the installation assembly in case of pressure differences between the two chambers.

In another embodiment the installation assembly comprises a seal-off apparatus, which, in the case of a measuring insert introduced into the assembly housing, serves to seal off the second safety chamber from the first safety chamber, especially in a pressure-tight and/or liquid-tight manner. The sealing mechanism in such case is similar compared to at least one embodiment of WO2011076481A1 Therefore; the present invention refers to WO2011076481A1 in its entirety.

In one embodiment, the measuring insert is at least partially fastened in the opening of the sealing element especially in a gas-tight and/or liquid-tight manner, preferably by means of at least one weld, a thread or a sealing. In this way, the sealing element and measuring insert are embodied to withstand structural loads when mounted in the assembly, in particular if the two chambers exhibit different pressures.

In another embodiment, the measuring insert may be at least partially fastened in the second housing part, especially in a gas-tight and/or liquid-tight manner, and also preferably by means of at least one weld, a thread or a sealing Advantageously, the connecting means comprise a clamp connector or a flange connector. Also, the connecting means may comprise a hinge and bolts or nuts.

In one embodiment the sealing element is arranged between a first surface of the first housing part and a second surface of the second housing part, which two surfaces face each other in case the installation assembly is assembled. In this concern it is of advantage, if at least one of the two surfaces comprises a cavity in which the sealing element is arranged.

Another embodiment comprises, that the sealing element is constructed such that it acts as a filter for at least one quantity contained in the process. The sealing element is embodied to be only permeable for certain quantities, e.g. of a gas mixture.

It is preferred, if the sealing element is at least partially composed by a metal, a graphite containing compound, or a synthetic material, e. g. a polyetheretherketone (PEEK), or a magnesium aluminum silicate (LAVA).

In one embodiment, the measuring insert comprises a sensing element for sensing the process variable of a medium in a container, preferably a sensing element for sensing a temperature of said medium. The measuring insert preferably is a temperature probe, e.g. comprising a thermocouple or a resistive element, e.g. a platin element.

Another embodiment comprises, that the measuring insert is arranged in a protective tube proceeding through the opening of the said sealing element.

It is of advantage, if the installation assembly further comprises at least one measuring transducer arranged on an end of said measuring insert, which transducer serves for processing at least the process variable of the medium determined by means of the measuring insert.

BRIEF DESCRIPTION OF THE DRAWINGS

In the following, the present invention will be explained in greater detail on the basis of the drawings presented in FIGS. 1-3.

The invention will now be explained in greater detail based on the appended drawing, the figures of which show as follows:

FIG. 1 shows an assembled installation assembly according to the present disclosure with two measuring inserts for sensing the temperature of a medium, FIG. 2 shows a detailed drawing of the sealing element according to the present disclosure in two different views, and FIG. 3 shows an installation assembly according to the present disclosure with a multitude of measuring inserts for sensing the temperature of a medium (a) when assembled and (b) when disassembled.

DETAILED DESCRIPTION

FIG. 1 shows an installation assembly 1 according to the present invention having two measuring inserts 2.1, 2.2. The measuring inserts 2.1, 2.2 each comprise a temperature sensor in the form of a thermocouple 2.1.1, 2.2.1, which is arranged in a protective tube 2.1.2, 2.2.2. The present invention of course is neither limited towards measuring inserts in the form of thermocouples nor to a total number of two measuring inserts 2.1, 2.2.

The assembly 1 further comprises an assembly housing 3 for accommodating the measuring inserts 2.1, 2.2. The housing 3 has a first housing part 4 with a first chamber 4a and a second housing part 5 with a second chamber 5a which are connected via a sealing element 6 and connecting means 7. The sealing element 6 serves to seal the second chamber 5a from the first chamber 4a and to seal the two chambers 4a, 5a from an external environment of the sensing assembly 1. Preferably, a gas-tight and/or liquid-tight connection becomes achievable.

In the embodiment of FIG. 1, the sealing element 6 has two openings 6.1 and 6.2 through which the measuring inserts 2.1, 2.2 proceed. The measuring inserts 2.1, 2.2 are fastened inside the openings 6.1, 6.2, e.g. by means of a weld, thread or sealing. Preferably, the measuring inserts 2.1 and 2.2 are secured within the openings 6.1 and 6.2 of the sealing element 6 in a gas tight and/or liquid tight manner. In other embodiments, the sealing element 6 may be constructed such that it acts as a filter for at least one quantity, especially chemical quantity, contained in the process. Preferably, the sealing element 6 is composed by a metal, a graphite containing compound or also by a synthetic material, e.g. PEEK or LAVA.

For connecting the first housing part 4 and the second housing part 5, the sealing element 6 is arranged between a first surface 4b of the first housing part 4 and a second surface 5b of the second housing part 5. When assembled, the first 4b and second surface 5b face each other. At least one of the two surfaces 4b, 5b may comprises a cavity, which serves as seat for the sealing element 6. The assembly components are assembled via connecting means 7 which here have the form of a clamp connector or flange connector. One possible example for a suitable flange connector is given by the Vector Techlok clamp connecter which may be purchased from Freudenberg (http://www.fogt.com/clamp-connector.html).

The first housing part 4 further comprises a process connection 8, and the second housing part 5 is further equipped with a sensing element 9. In the embodiment of FIG. 1 by way of example, the sensing element 9 may serve to monitor a pressure inside the second chamber 5a. In other embodiments the sensing element 9 in turn may be embodied for sensing a density or a chemical composition of a medium contained in the second chamber 5a. Also, the first housing part 4 may comprise an additional sensing element 9.

Similar as the sealing element 6, the second housing part 5 also has two openings 5.1 and 5.2 through which the measuring inserts 2.1 and 2.2 proceed. In the shown embodiment the measuring inserts 2.1 and 2.2 are fastened within the openings by means of sealing elements 10.1 and 10.2. It shall be mentioned, that in other embodiments other fastening means may also be employed. The openings 5.1 and 5.2 thus serve fora guidance of the measuring inserts 2.1 and 2.2 towards the process medium for which at least on process variable is to be sensed by means of the sensing elements 2.1.1 and 2.2.1.

FIG. 2 shows a detailed view of the sealing element 6 in two different views. As becomes visible from FIG. 2a, the sealing element 6 comprises a multitude of opening 6.1-6.6 through each of which a measuring insert 2.1 or 2.2 may proceed. If less measuring inserts 2.1-2.6 than openings 6.1-6-6.6 are to be employed, at least one opening 6.1-6.6 may optionally also be closed by means of dummy element [not shown]. FIG. 2b shows a view of FIG. 2a along the cross section B marked in FIG. 2a.

The sealing element 6 is embodied such that it matches the dimensions of the two housing parts 4,5, especially, to the dimensions of the first surface 4b of the first housing part 4 and a second surface 5b of the second housing part 5. When assembled, the sealing element 6 is in direct contact with the first 4 and second housing part 5. Optionally, the sealing element 6 may comprise at least one circular cavity 6a. Such cavities enhance the mechanical stability of the sealing element 6, in particular during a mounting process of the sensing assembly 1. Also the sealing element 6 may at least be partially lubrified prior to mounting.

FIG. 3 shows an installation assembly 1 similar to that shown in FIG. 1 for accommodating a multitude of measuring inserts 2 in a perspective view. In FIG. 3a, the assembly 1 is shown in its assembled state, while in FIG. 3b the disassembled assembly 1 can be seen for making more details visible. Already discussed elements will thus not be discussed again.

Due to the modularity, the installation assembly 1 can be easily assembled or dissembled on-site, meaning close to the process. The measuring inserts 2 and also other components are easily accessible and/or exchangeable. This in turn reduces interruption times of the processes in which the installation assembly 1 is used. Further, it is of advantage that not only the entire installation assembly 1 can be replaced in case of a failure. Rather, the present invention facilitates to remove or exchange single components which show a failure. This in turn safes costs.

The invention claimed is:

1. A modular installation assembly, comprising:
   an assembly housing for accommodating at least a part of said measuring insert, wherein the assembly housing includes a first housing part and a second housing part;
   wherein a first chamber is provided in said first housing part and a second chamber provided in said second housing part;
   a sealing element having at least one opening through which the measuring insert proceeds;
   a rod-shaped measuring insert for sensing a process variable of a medium, which measuring insert comprises a sensing element for sensing the process variable, and which measuring insert proceeds through at least one of the housing parts and the sealing element; and
   a connecting structure for detachably connecting said first housing part with said second housing part via the sealing element;
   wherein the measuring insert is at least partially fastened in said opening of said sealing element;
   wherein the assembly is embodied to seal off the first housing part from the second housing part in case of a leakage at the first housing part;
   wherein the sealing element serves to seal the second chamber from the first chamber, and the first chamber and the second chamber from an external environment of the installation assembly in a gas-tight or liquid-tight configuration.

2. The installation assembly according to claim 1, wherein the first housing part has a process connection arranged on a side of the first housing part opposite to a side on which the first housing part is connected with the second housing part.

3. The installation assembly according to claim 1, wherein the second housing part includes a sensing element for monitoring the chamber of said second housing part.

4. The installation assembly according to claim 3, wherein the sensing element serves for sensing a density, a pressure, or a chemical composition of a medium contained in said second chamber.

5. The installation assembly according to claim 1, wherein the measuring insert is at least partially fastened in said at least one opening of said sealing element in a gas-tight and/or liquid-tight manner using at least one weld, a thread, or a sealing.

6. The installation assembly according to claim 1, wherein the connecting means includes a clamp connector or a flange connector.

7. The installation assembly according to claim 1, wherein the sealing element is arranged between a first surface of the first housing part and a second surface of the second housing part, wherein the two surfaces face each other when the installation assembly is assembled.

8. The installation assembly according to claim 7, wherein at least said first or second surface has a cavity in which the sealing element is arranged.

9. The installation assembly according to claim 1, wherein the sealing element is constructed such that it acts as a filter for at least one quantity contained in the process.

10. The installation assembly according to claim 1, wherein the sealing element is at least partially composed of a metal, a graphite containing compound, or a synthetic material including polyetheretherketone (PEEK) or LAVA.

11. The installation assembly according to claim 1, wherein said measuring insert includes a sensing element for sensing the process variable of a medium in a container.

12. The installation assembly according to claim 7, wherein the measuring insert is arranged in a protective tube, the protective tube proceeding through the opening of the sealing element.

13. The installation assembly as claimed in claim 7, further comprising:
   a measuring transducer arranged on an end of said measuring insert, wherein the transducer serves for processing at least the process variable of the medium determined by means of the measuring insert.

* * * * *